United States Patent
Nishino et al.

(10) Patent No.: US 10,140,726 B2
(45) Date of Patent: Nov. 27, 2018

(54) APPARATUS AND METHOD FOR ESTIMATING GAZED POSITION OF PERSON

(71) Applicant: CANON KABUSHIKI KAISHA, Tokyo (JP)

(72) Inventors: Daisuke Nishino, Kawasaki (JP); Kotaro Yano, Tokyo (JP); Yuji Kaneda, Kawasaki (JP); Hiroyuki Uchiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 15/050,725

(22) Filed: Feb. 23, 2016

(65) Prior Publication Data
US 2016/0247272 A1 Aug. 25, 2016

(30) Foreign Application Priority Data
Feb. 25, 2015 (JP) ................. 2015-035751

(51) Int. Cl.
| | |
|---|---|
| H04N 7/18 | (2006.01) |
| G06T 7/70 | (2017.01) |
| G06K 9/00 | (2006.01) |
| G06F 3/01 | (2006.01) |
| G06F 3/03 | (2006.01) |

(52) U.S. Cl.
CPC ............ *G06T 7/70* (2017.01); *G06F 3/013* (2013.01); *G06F 3/0304* (2013.01); *G06K 9/00604* (2013.01); *G06T 2207/30196* (2013.01)

(58) Field of Classification Search
CPC ............ G06T 7/70; G06T 2207/30196; G06F 3/0304; G06F 3/013; G06K 9/00604
USPC ......................................... 348/78
See application file for complete search history.

(56) References Cited

U.S. PATENT DOCUMENTS 7,742,623 B1 * 6/2010 Moon ............... G06K 9/00604
382/103

FOREIGN PATENT DOCUMENTS

JP 2007-286995 A 11/2007

OTHER PUBLICATIONS

Zhang, "A Flexible New Technique for Camera Calibration", IEEE Transactions on Pattern Analysis and Machine Intelligence, 22(11), 1330-1334, 2000, pp. 1-22.

(Continued)

*Primary Examiner* — Allen C Wong
(74) *Attorney, Agent, or Firm* — Carter, DeLuca, Farrell & Schmidt, LLP

(57) ABSTRACT

An image processing apparatus comprises: a detecting unit to detect, respectively from plural images obtained by imaging with plural imaging units a space in which plural persons exist, positions of the persons on the images; an associating unit to perform association of a same person in the plural images; a person position estimating unit to estimate positions of the persons in the space, based on the positions of the persons on the images detected from the plural images and a result of the association by the associating unit; a direction estimating unit to estimate eye directions of the persons, based on the plural images; and a distribution estimating unit to estimate a spatial distribution of positions gazed by the plural persons, based on the estimated positions of the plural persons in the space and the estimated eye directions of the plural persons.

14 Claims, 7 Drawing Sheets

(56) References Cited

OTHER PUBLICATIONS

Moulon et al., "Adaptive Structure from Motion with a contrario model estimation", ACCV 2012, pp. 1-14.
Dalal et al., "Histograms of Oriented Gradients for Human Detection", Computer Vision and Pattern Recognition, IEEE computer Society Conference, vol. 1, 2005, pp. 1-8.
Hartley et al., "Multiple View Geometry in Computer Vision Second Edition", Cambridge University Press, 2000, pp. 23-64.

* cited by examiner

APPARATUS AND METHOD FOR ESTIMATING GAZED POSITION OF PERSON

BACKGROUND OF THE INVENTION

Field of the Invention

The present invention relates to an apparatus which estimates a gazed position of a person in an image, and a method which is applicable for the apparatus.

Description of the Related Art

Conventionally, for example, Japanese Patent Application Laid-Open No. 2007-286995 discloses the method of estimating a position gazed by a person. In this method, an eye (or visual line) direction of the person is estimated from an image obtained by a camera, a positional relation between the estimated eye direction and a previously registered target object is obtained, and the gazing level of the target object is analyzed based on the obtained positional relation.

However, in the above conventional method, the target object is estimated from the estimated eye direction of the person, on the premise that the person is in a certain place. Therefore, there is a problem that estimation accuracy deteriorates if the person moves from the relevant place.

SUMMARY OF THE INVENTION

The present invention aims to provide a technique capable of estimating an eye direction of a person with a high degree of accuracy even in a case where the person moves.

According to one aspect of the present invention, an image processing apparatus comprises; a detecting unit configured to detect, respectively from plural images obtained by imaging with plural imaging units a space in which plural persons exist, positions of the persons on the images; an associating unit configured to perform association of a same person in the plural images; a person position estimating unit configured to estimate positions of the persons in the space, based on the positions of the persons on the images detected from the plural images and a result of the association by the associating unit; a direction estimating unit configured to estimate eye directions of the persons, based on the plural images; and a distribution estimating unit configured to estimate a spatial distribution of positions gazed by the plural persons, based on the estimated positions of the plural persons in the space and the estimated eye directions of the plural persons.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiments

Hereinafter, an example that the position of a human body is detected from an image, an eye direction is estimated from the detected human body, and a distribution of gazed positions is estimated based on the estimated eye directions will be described.

Figure 1:
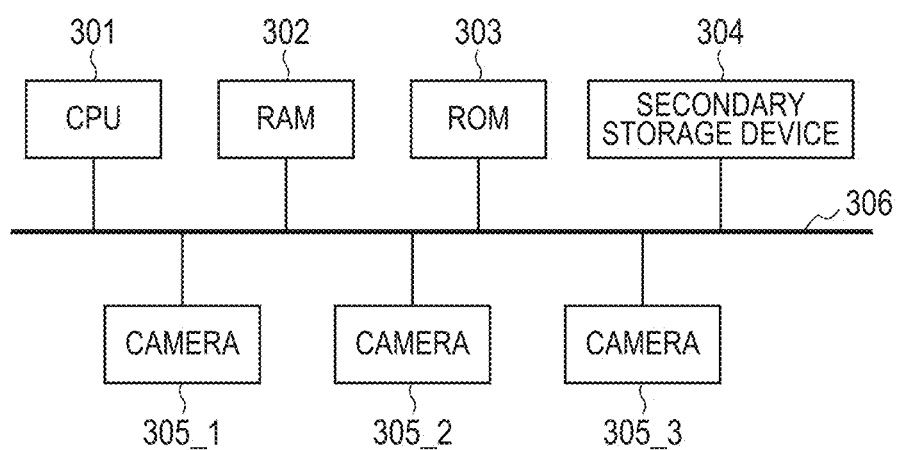
FIG. 1 is a block diagram illustrating the hardware constitution of an image analyzing apparatus.

FIG. 1 is a block diagram illustrating the hardware constitution of an image analyzing apparatus. The image analyzing apparatus comprises a CPU (central processing unit) 301, an RAM (random access memory) 302, an ROM (read only memory) 303, a secondary storage device 304, plural cameras 305-1 to 305-n, and a connection bus 306, as the hardware constitution.

The CPU 301 controls the whole of the image analyzing apparatus by executing programs stored in the RAM 302 and/or the ROM 303.

The RAM 302, which is a volatile memory, stores therein temporary data such as image data, programs, execution results of the programs, and the like.

The ROM 303, which is a non-volatile memory, stores therein programs and various parameter data. On the premise that the CPU 301 performs processes based on the programs stored in the ROM 303 or the secondary storage device 304, the functions of the image analyzing apparatus and the process indicated by the later-described flow chart are achieved.

The secondary storage device 304, which is a rewritable secondary memory such as a hard disk drive, a flash memory or the like, stores therein the process results of the image analyzing apparatus, log data of the image analyzing apparatus, and the like.

Each of the cameras 305-1 to 305-n is a general camera which is constituted by an imaging device, a storage for storing obtained images, and a communicating device for outputting the images outward. Here, the cameras 305-1 to 305-n respectively correspond to imaging units 101-1 to 101-n illustrated in FIG. 2. Although the number "n" of the cameras to be connected is "3" in the present embodiment, the present invention is not limited to this.

The connection bus 306 is used to connect hardware components with others and mutually input and output data.

In the present embodiment, although the later-described process is achieved by the CPU 301 based on the programs, a part or all of the process may be achieved by a means different from the CPU. For example, a dedicated circuit (an ASIC (application specific integrated circuit)), various processors (a reconfigurable processor, a DSP (digital signal processor), a GPU (graphics processor unit)) or the like can be used instead of the CPU.

Here, the image analyzing apparatus is an example of an image processing apparatus.

Figure 2:
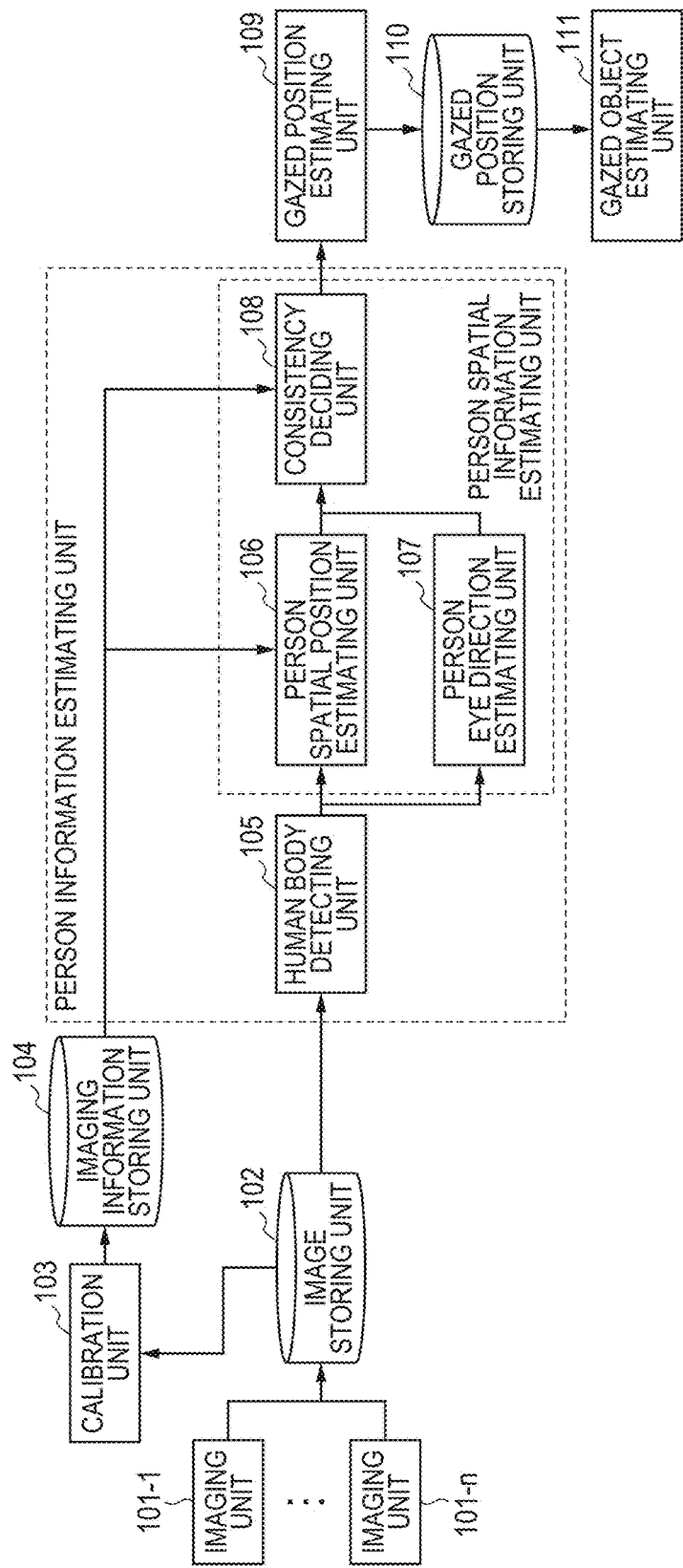
FIG. 2 is a block diagram illustrating the function constitution of the image analyzing apparatus.

FIG. 2 is the block diagram, illustrating an example of the function constitution of the image analyzing apparatus.

The imaging units 101-1 to 101-*n* respectively correspond to the cameras. Here, "n", which is the number of the cameras, is "2" or more in the present embodiment. An image photographed by each camera is stored in an image storing unit 102, A calibration unit 103 performs calibration of each of the imaging units 101-1 to 101-*n*. Then, the calibration unit 103 stores imaging information obtained by the calibration in an imaging information storing unit 104, A human body detecting unit 105 detects the position of a human body on each of the images respectively obtained by the imaging units 101-1 to 101-*n*. A person spatial position estimating unit 106 performs association of the human bodies respectively detected from the plural images correspond to the same person, and estimates the spatial position of the person for each association. A person eye direction estimating unit 107 estimates an eye direction of the person from each human body image. A consistency deciding unit 108 determines consistency of the association of the person based on the estimation result of the spatial position of the person and the estimation result of the eye direction of the person, and decides the association of the person. A gazed position estimating unit (a distribution estimating unit) 109 estimates the spatial distribution of the gazed positions from the associated spatial position and eye direction of the person. A gazed position storing unit 110 stores therein the estimated spatial distribution of the gazed positions. A gazed object estimating unit 111 estimates a gazing level (or a gazing degree) for each gazed object from the spatial distribution of the gazed positions.

Figure 3:
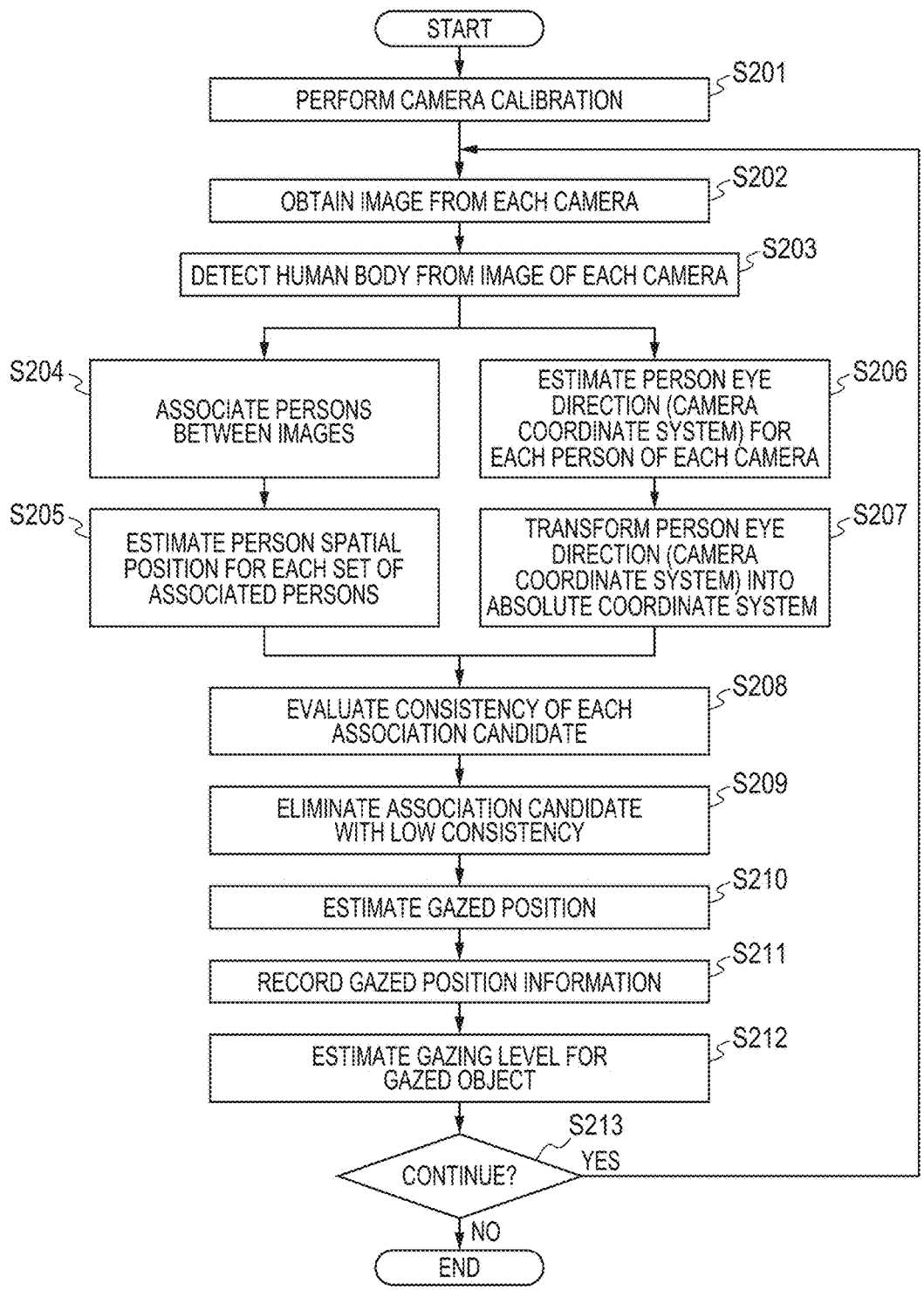
FIG. 3 is a flow chart for describing an information process to be performed by the image analyzing apparatus.

FIG. 3 is a flow chart for describing an example of the information process to be performed by the image analyzing apparatus.

In S201, the calibration unit 103 performs the calibration of the imaging unit 101. Here, the calibration unit 103 estimates internal and external parameters of each camera by using the image of each camera stored in the image storing unit 102. If the internal and external parameters of the camera are known, the calibration unit 103 can convert (or transform) the absolute coordinates into the two-dimensional camera coordinates by the following expression (1).

$$m=A[R\ t]M \quad (1)$$

Here, $M=[X\ Y\ Z\ 1]^T$ is the three-dimensional absolute coordinates, and $m=[x\ y\ 1]^T$ is the two-dimensional image coordinates.

Further, A is the internal parameter represented by a 3×3 matrix, and indicates the central position of the camera in the image coordinate system, a magnification, and distortion of the two axes of the image, R is a 3×3 orthogonal matrix indicating the orientation (position) of the camera, and t is a 3×1 matrix indicating the position of the camera.

The internal parameter A and the external parameters R and t can be obtained, by the method described in the following reference literature 1.

(Reference Literature 1) Zhengyou Zhang, "A Flexible New Technique for Camera Calibration", IEEE Transactions on Pattern Analysis and Machine Intelligence, 22 (11): 1330-1334, 2000

The above method will be described simply. First, the image analyzing apparatus photographs a calibration board (planar plate) provided in a space. A lattice pattern such as the pattern of a chessboard has been drawn on the calibration board, and the positions and the intervals of the lattice points have been known. The image analyzing apparatus photographs the calibration board, of which the positions have been changed, plural times by using the camera, extracts image coordinates m of the lattice points from the obtained images, and estimates the internal parameter A by associating absolute coordinates M with the image coordinates m. In the case where there are the plural cameras as in the present embodiment, the image analyzing apparatus repeats such analysis by the number of times corresponding to the number of the cameras, and estimates the internal parameter for each camera. Next, the image analyzing apparatus simultaneously photographs the calibration board by the plural cameras, and estimates the external parameters R and t of each camera by associating the absolute coordinates M and the image coordinates m of each camera with use of the previously estimated internal parameter.

By the above calibration, the information concerning the internal parameter A and the external parameters R and t of each camera is stored in the imaging information storing unit 104.

In the present embodiment, the image analyzing apparatus performs the calibration by using the calibration board. However, it may be possible to perform the calibration by a method of extracting feature points in images and associating the images between the extracted feature points, as described, in the following reference literature 2.

(Reference Literature 2) Pierre Moulon, Pascal Monasse, and Renaud Marlet, "Adaptive Structure from Motion with a contrario model estimation", ACCV 2012

Next, in S202, each camera of the imaging unit 101 photographs a scene to obtain an image, and stores the obtained image in the image storing unit 102.

In S203, the human body detecting unit 105 detects the human body from each image photographed in S202, and extracts position information indicating the position of the detected human body. Here, the human body detecting unit 105 extracts the position of the human body by the method described in the following reference literature 3.

(Reference Literature 3) Navneet Dalai, et al., "Histograms of Oriented Gradients for Human Detection"

First, the human body detecting unit 105 divides the photographed image into latticed blocks, and calculates the HOG (histograms of oriented gradients) feature amount of each block. Next, the human body detecting unit 105 sets a detection window which consists of the plural blocks, and links together the HOG feature amounts of the respective blocks included in the detection window to obtain a new feature amount. The human body detecting unit 105 inputs the obtained feature amount to an SVM (support vector machine) discriminator previously machine-learned, and thus decides whether or not the human body is included in the detection window. If it is decided by the SVM discriminator that the human body is included in the detection window, the human body detecting unit 105 outputs a person area determined by the rectangle of the detection window. For example, the person area is represented by a combination of the upper left coordinates (x, y) and the width and height (w, h) of the rectangle in the image coordinate system. Here, if plural persons exist in the image, the human body detecting unit 105 outputs the person areas for the respective persons.

In the present embodiment, the human body is detected by the HOG feature amount and the SVM discriminator. However, any human body detecting method may be adopted if it can detect a person. Further, it may be possible to detect a face or a facial organ, instead of a human body.

In S204, the person spatial position estimating unit 106 associates the persons detected in S203 between the images. That is, the person spatial position estimating unit 106 checks to which person in another image the person detected in a certain image corresponds.

Figure 4:
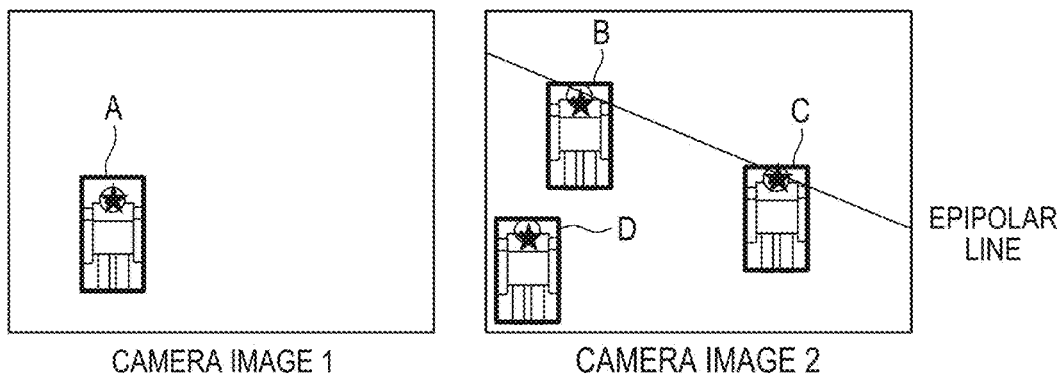
FIG. 4 is a diagram for describing object association between cameras.

The person spatial position estimating unit 106 performs the association of the persons between the images, by associating the representative coordinate points (image coordinate system) of the persons by epipolar geometry. For example, the representative coordinate point is the central position of a face. The representative point of a human body A in a camera image 1 of FIG. 4 is represented by the straight line called an epipolar line in a camera image 2. A camera basic matrix F of cameras 1 and 2, which represents the positional relation of the two cameras, is defined by the following expression (2).

$$m_2^T F m_1 = 0 \qquad (2)$$

Here, $m_1$ and $m_2$ are the respective representative point coordinates of the corresponding persons on the cameras 1 and 2 in each image coordinate system, The person spatial position, estimating unit 106 can calculates the camera basic matrix F from the internal parameters A and the external parameters R and t of the respective cameras 1 and 2, by the method described in the following reference literature 4.

(Reference Literature 4) Richard Hartley and Andrew Zisserman, "Multiple View Geometry in Computer Vision Second Edition", CAMBRIDGE UNIVERSITY PRESS Assuming that $m_1$ is the representative point coordinates of the human body detected on the camera 1, the representative point coordinates $m_2$ of the human body on the camera 2 corresponding to the representative point coordinates $m_1$ exist on an epipolar line l as indicated, by the following expression (3) if there is no noise.

$$l = F m_1 \qquad (3)$$

Since there are really influences of various noises, $m_2$ does not necessarily exist on the epipolar line l even if $m_1$ and $m_2$ are the corresponding points. Consequently, the person spatial position estimating unit 106 calculates the distance between the representative point coordinates $m_2$ of the human body detected by the camera 2 and the epipolar line 1 based on the left side of the expression (2), and sets the human body for which the calculated value is a certain value or less as a candidate of the corresponding human body. For example, in FIG. 4, the human body A in the camera image 1 corresponds to human bodies B and C in the camera image 2. The human body of another camera corresponding to the human body of a certain camera must be one for one camera. Therefore, the person spatial position estimating unit 106 obtains a combination of the sets of the human bodies which are associated so as to satisfy such a theory. As a result, {A, B} and {A, C} are generated as the candidates of the sets of the human bodies associated with the human body A in the camera image 1 of FIG. 4.

Figure 5:
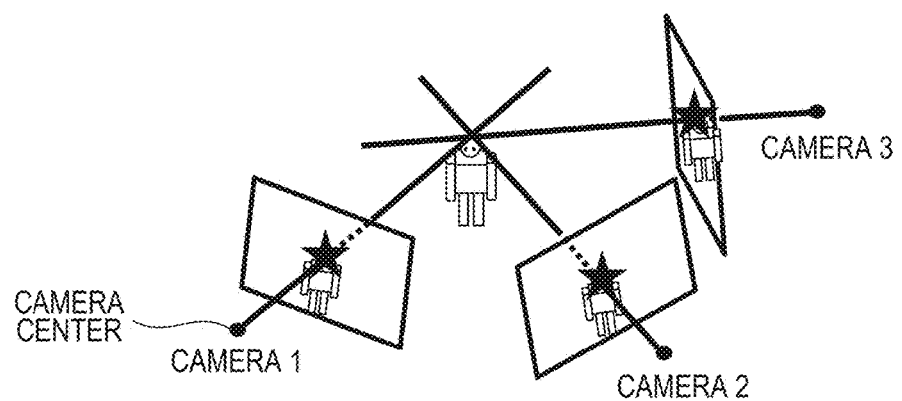
FIG. 5 is a diagram for describing 3D (three-dimensional) position estimation.

In S205, the person spatial position estimating unit 106 estimates the spatial positions of the persons for the set of the associated persons extracted in S204. Initially, as illustrated in FIG. 5, the person spatial position estimating unit 106 obtains the straight line through the camera center and the representative point of the human body area in a three-dimensional space, for each camera image. More specifically, the person spatial position estimating unit 106 obtains this straight line from the internal and external parameters of the camera and the image coordinates of the representative point. Next, the person spatial position estimating unit 106 obtains the intersection point of the straight lines of the respective cameras, and sets the obtained intersection point as the three-dimensional position of the human body. There is a case where the straight lines do not practically intersect at one point due to an estimation error of the straight line or the like. In this case, the person spatial position estimating unit 106 adopts, instead of the intersection point, the point at which the sum of the distances from the respective straight lines becomes minimum.

Figure 6:
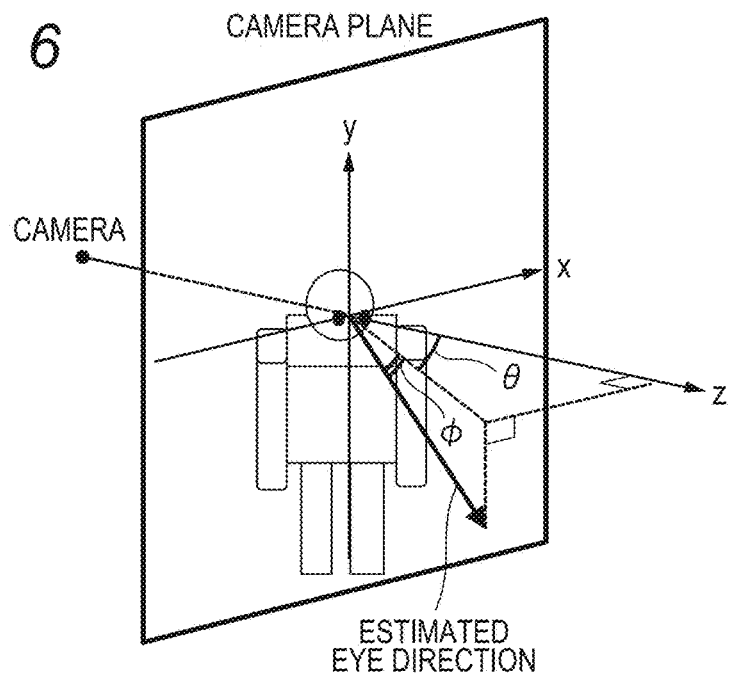
FIG. 6 is a diagram for describing a method of representing an eye direction by an elevation angle and a deflection angle.

In S206, the person eye direction estimating unit 107 estimates the eye direction of each person detected in each image, on the camera coordinate system of each camera. That is, the person eye direction estimating unit 107 first extracts the human body image by cutting out the rectangles of the detected human body from the image. Then, the person eye direction estimating unit 107 converts these rectangles into the certain-shape rectangles by normalizing the width and height of the human body image, and inputs the obtained images to a regression estimator as the feature amounts. The regression estimator has been previously machine-learned so as to output the eye direction (relative coordinates from the camera) of the person as two-dimensional amounts (e.g., an angle $\theta$ of deviation and an angle $\Phi$ of elevation illustrated in FIG. 6). For example, a neural network can be used as the regression estimator. Thus, it is possible to obtain the eye direction of the person on the camera coordinate system.

In the present embodiment, the eye direction is estimated from the human body image by the regression estimator. However, the eye direction may be estimated by another method.

For example, the person eye direction estimating unit 107 may detect the positions of plural facial organs by detecting the face from the human body image, and input the detected positions to the regression estimator to calculate the direction of the face. Besides, for example, the person eye direction estimating unit 107 may detect the position of a pupil, and estimate the eye direction from the coordinates of the detected pupil position by a geometric operation, as disclosed in Japanese Patent Application Laid-Open No. 2007-286995.

It is possible to estimate the direction with a higher degree of accuracy based on, instead of the direction of a whole human body, a more detailed partial image such as a face, a pupil or the like. On the other hand, a high-resolution image is necessary to estimate an image of a detailed portion.

Incidentally, the person eye direction estimating unit 107 may use such plural kinds of eye direction estimating methods as described above.

In S207, the person eye direction estimating unit 107 transforms the person eye direction (camera coordinate system) extracted in S206 into the absolute coordinate system. The person eye direction estimating unit 107 converts the eye direction in the camera coordinate system into the eye direction in the absolute coordinate system, by using the internal parameter A and the external parameters R and t of the camera by which the person eye direction is obtained.

In S208, the consistency deciding unit 108 calculates the consistency of each association candidate from the person spatial position of each association candidate obtained in S205 and the person eye direction for each person image obtained in S207.

Here, the consistency indicating that persons respectively detected by the imaging units 101-1 and 101-2 are the same is calculated. The consistency includes consistency $R_p$ of the person spatial position and consistency $R_d$ of the person eye direction.

First, how to calculate the consistency $R_p$ will be described. With respect to each of the associated two cameras, the consistency deciding unit 108 projects the height of the person area detected in S203 to the person spatial position calculated in S205 by using the internal and external parameters of the respective cameras. Then, the consistency deciding unit 108 estimates the height of the person in the three-dimensional space. Here, it is assumed that the heights of the person in the three-dimensional space obtained by the respective cameras 1 and 2 are $h_1$ and $h_2$. Based on these parameters, the consistency deciding unit 108 calculates the consistency $R_p$ of the person spatial position by the following expression (4).

$$R_p = \exp\{-K(h_1 - h_2)^2 / (h_1^2 + h_2^2)\} \quad (4)$$

The consistency deciding unit 108 calculates the consistency $R_d$ of the person eye direction based on a degree of consistency of the eye directions of the associated persons. In the present embodiment, the consistency deciding unit 108 uses, as the consistency, a cosine of the angle of the person eye direction estimated in each image. If it is assumed that the eye directions of the respective cameras 1 and 2 in the absolute coordinates system obtained in S207 are $d_1$ and $d_2$, the consistency $R_d$ of the person eye direction is obtained by the following expression (5).

$$R_d = d_1 \cdot d_2 \quad (5)$$

The consistency deciding unit 108 calculates the final consistency R based on the weighted sum of the consistency $R_p$ of the person spatial position and the consistency $R_d$ of the person eye direction, by the following expression (6).

$$R = w_p R_p + w_d R_d \quad (6)$$

Here, a predetermined value is used as each of the weights $w_p$ and $w_d$.

In the present embodiment, the consistency deciding unit 108 calculates the consistency from the estimated person spatial position and the estimated person eye direction. However, it is also possible to calculate the consistency by using features such as color of the clothes of the person, similarity of the face of the person and the like, the size of detected person area, and the like.

In S209, the consistency deciding unit 108 compares the consistency of the association candidate calculated in S208 with a predetermined threshold, and thus eliminates the association candidate of which the consistency is low from the target to be processed because a possibility that the relevant association candidate is the same person is low. On the other hand, the consistency deciding unit 108 decides that the association candidate of which the consistency exceeds the predetermined threshold is the same person.

The consistency deciding unit 108 determines the person eye direction for which the camera association has been determined, from the person spatial position obtained in S205 and the eye direction estimated in each camera obtained in S207. For example, the consistency deciding unit 108 selects the camera of which the eye direction is closest to the front direction, and selects the estimated eye direction of the selected camera. Further, the consistency deciding nit 108 may perform the estimation of the eye direction by plural methods using the human body, the face, the pupil and the like. In such a case, it is possible to expect to further increase accuracy. That is, the consistency deciding unit 108 may use a result estimated based on a more detailed portion.

In S210, the gazed position estimating unit 109 estimates the position gazed by each person associated between the images.

Figure 7:
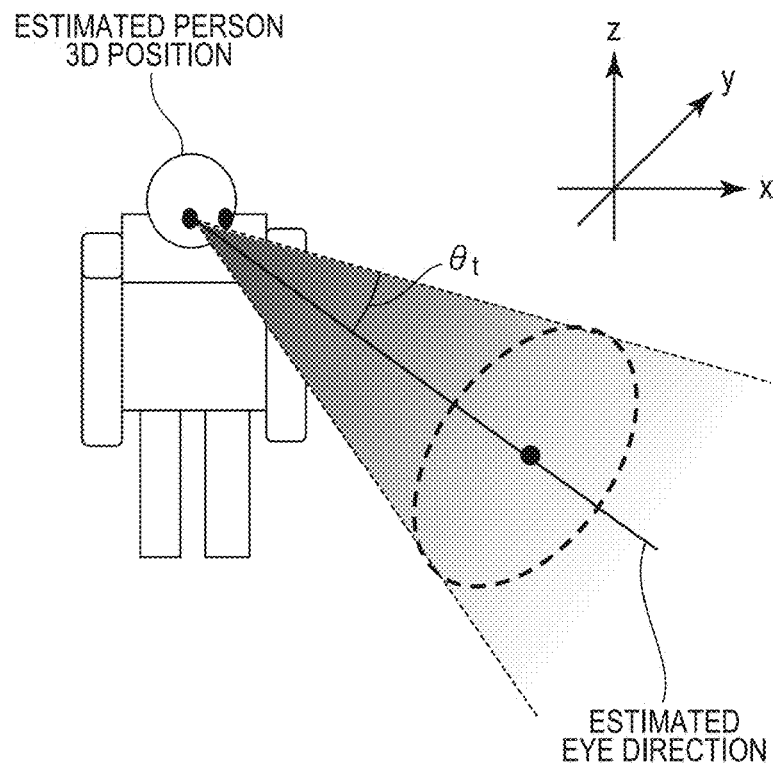
FIG. 7 is a diagram illustrating a distribution of gazed positions of a certain person in a 3D space.

Here, as illustrated in FIG. 7, an infinitely extending cone of which the apex corresponds to the spatial position of a certain person and the center line corresponds to the eye direction of the certain person is assumed. It is possible to estimate that the target gazed by the person exists within the relevant cone. The gazed position estimating unit 109 uses a predetermined value as an apex $\theta_t$ of the cone.

Figure 8:
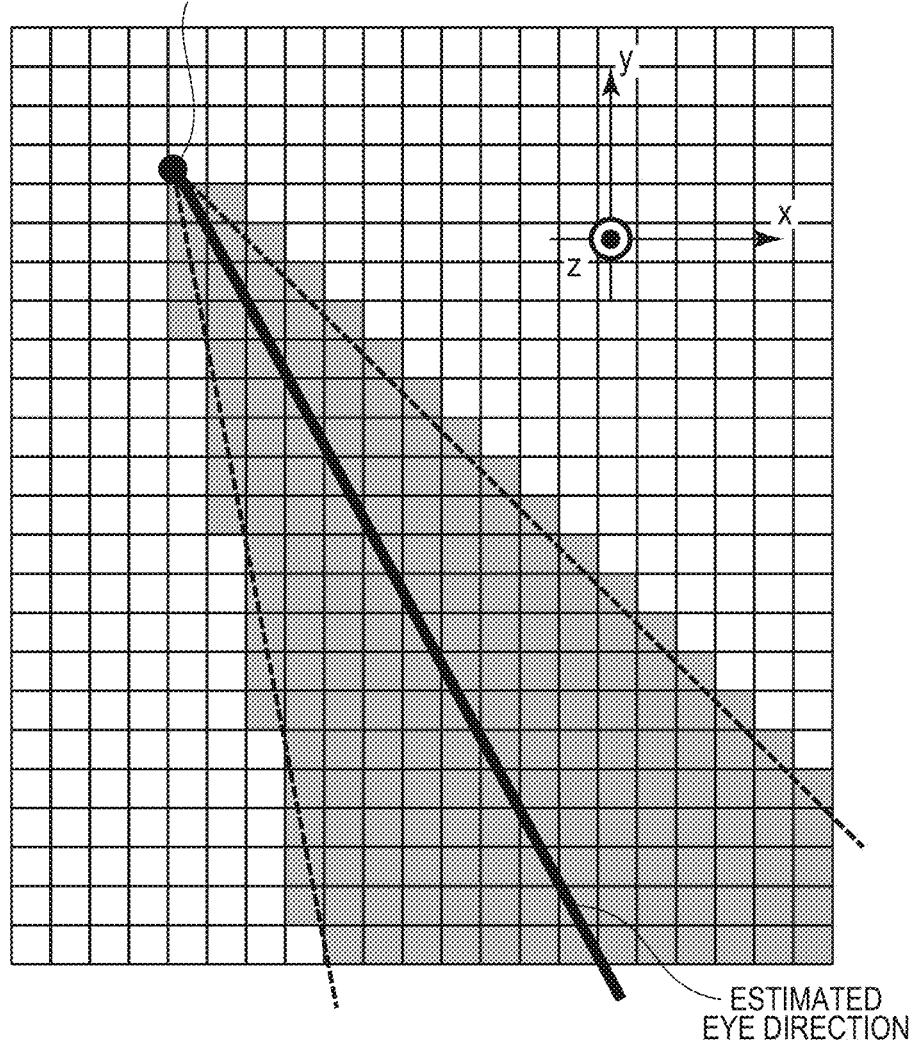
FIG. 8 is a diagram for describing a method of measuring a spatial distribution of gazed positions.

Gazed position information indicating the gazed position can be expressed by dividing a space into minute cubic lattices and considering a gazing level of each lattice. FIG. 8 is a diagram illustrating the position relation between the lattices and the cone. In this diagram, it should be noted that the space is projected to a two-dimensional plane for simplicity. The gazed position estimating unit 103 previously Initializes all the lattices by a score of "0". The shaded lattices are the lattices which intersect the cone, and it is possible to estimate that the object gazed by the person exists within the area of the shaded lattices. Therefore, the gazed position estimating unit 109 adds a score of "1" to each of the lattices intersecting the cone. Thus, it is possible to express the spatial gazed position distribution of the person. The gazed position estimating unit 109 performs this operation to each person. Thus, it is possible to estimate the spatial distributions corresponding to the numbers of the persons who gaze respective positions in this scene.

Although the space is two-dimensionally expressed in FIG. 8 for the purpose of simple description, the gazed position estimating unit 109 actually performs the above process in the three-dimensional space.

In the present embodiment, the gazed position estimating unit 109 equally gives the score of "1" to the respective lattices which intersect the cone. In such a method, it is possible to measure the spatial distributions corresponding to the number of the gazing persons in the scene. On the other hand, the gazed position estimating unit 109 may add, to the score of each lattice, a weight based on geometric features such as the distance from the center line of the cone, the distance from the person and the like, the association consistency of the person, and the like.

Further, in the present embodiment, the method of dividing the space into the cubic lattices has been described. However, it may be possible to use any dividing method if it can divide the three-dimensional space just enough.

In S211, the gazed position estimating unit 109 stores the gazed position distribution obtained in S210 in the gazed position storing unit 110.

In S212, when the spatial information of the gazed target object can be used, the gazed object estimating unit 111 estimates the gazing level for each gazed target object based on the gazed position distribution stored in the gazed position storing unit 110.

Figure 9:
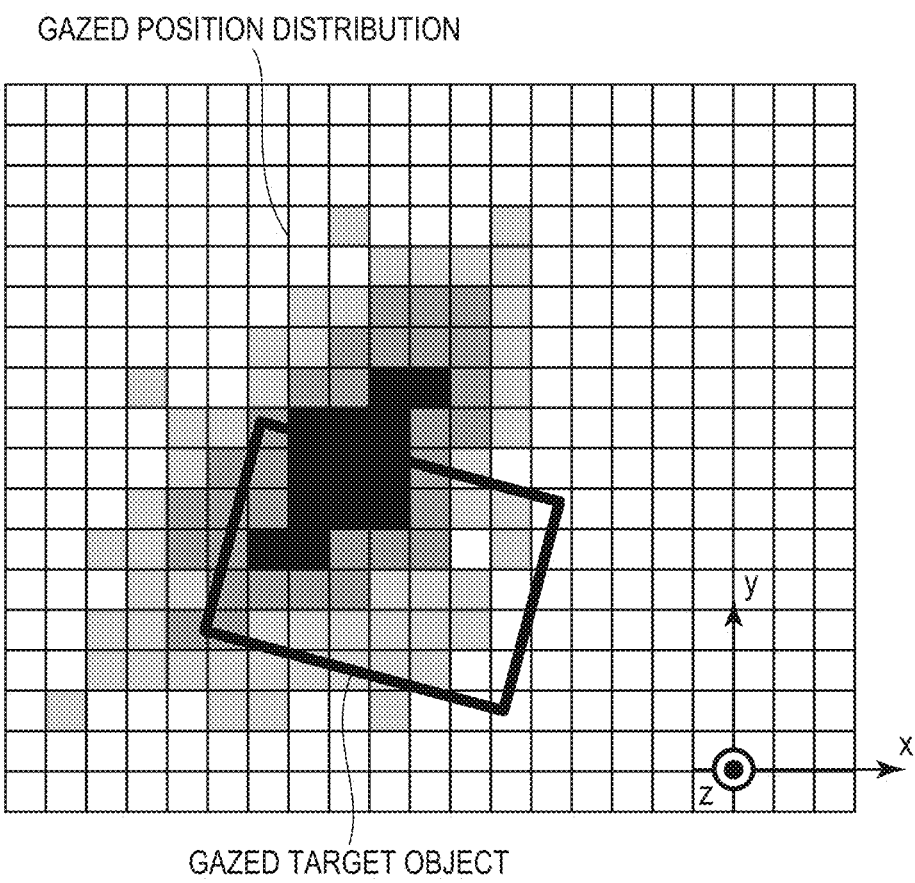
FIG. 9 is a diagram for describing a method of estimating a gazing level of an object by collating the spatial distribution of the gazed positions and a gazed target object.

Here, a cuboid represented by the width, the height, the depth and the orientation of the gazed target object is assumed as the coordinate information of the gazed target object. FIG. 9 is a diagram illustrating the gazed position distribution and the cuboid which have been projected to a two-dimensional plane for the purpose of simple description. In FIG. 9, the cuboid is represented by the rectangle. To estimate the gazing level of the object, the gazed object estimating unit 111 only has to calculate the maximum value of the gazed position distribution obtained in S210, from among the lattices included in the rectangle.

In the present embodiment, the cuboid is assumed as the geometric shape of the gazed target object. However, it may be possible to use any shape if it can be expressed in the three-dimensional space.

In S213, the image analyzing apparatus decides whether or not to continue the process. If it is decided to continue the process, the process is returned to S202. On the other hand, if it is decided not to continue the process, the process in the flow chart of FIG. 3 is ended.

According to the present embodiment as described above, in case of estimating the position gazed by the person in S210, it is possible to accurately estimate the eye direction of the person by using the spatial position of the person obtained in S205 even if the position of the person has been shifted. Moreover, according to the present embodiment, since the higher accurate estimation result is used by estimating the directions for the respective persons from the plural cameras, it is possible to expect the estimation result with a high degree of accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from, the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-035751, filed Feb. 25, 2015, which is hereby incorporated by reference herein in its entirety.

What is claimed is:

1. An image processing apparatus comprising:
   one or more processors; and
   a memory coupled to the one or more processors, the memory having stored thereon instructions which, when executed by the one or more processors, cause the image processing apparatus to:
   detect, respectively from plural images obtained by imaging with plural imaging units a space in which plural persons exist, positions of the persons on the images;
   perform association of a same person in the plural images;
   estimate positions of the persons in the space, based on the positions of the persons on the images detected from the plural images and a result of the association;
   estimate eye directions of the persons, based on the plural images;
   estimate a spatial distribution of positions gazed by the plural persons, based on the estimated positions of the plural persons in the space and the estimated eye directions of the plural persons; and
   estimate a gazing level for each object, based on the estimated spatial distribution of the gazed positions.

2. The image processing apparatus according to claim 1, wherein execution of the instructions further causes the image processing apparatus to obtain respective imaging parameters of the plural imaging units.

3. The image processing apparatus according to claim 2, wherein execution of the instructions further causes the image processing apparatus to estimate the position of the person in the space, based on the positions of the persons on the image and the respective imaging parameters of the plural imaging units.

4. The image processing apparatus according to claim 2, wherein execution of the instructions further causes the image processing apparatus to estimate the spatial distribution of the positions gazed by the persons, based on the positions of the persons in the space, the eye directions and the respective imaging parameters of the plural imaging units.

5. The image processing apparatus according to claim 2, wherein execution of the instructions further causes the image processing apparatus to obtain internal parameters and external parameters of the plural imaging units calculated from the plural images respectively imaged by the plural imaging units, as the imaging parameters.

6. The image processing apparatus according to claim 5, wherein the internal parameter includes at least one of information indicating a central position of the imaging unit in an image coordinate system, information indicating a magnification, and information indicating distortion of two axes of image.

7. The image processing apparatus according to claim 5, wherein the external parameter includes information indicating a position or an orientation of the imaging unit.

8. The image processing apparatus according to claim 1, wherein execution of the instructions further causes the image processing apparatus to estimate the eye direction of the person, based on a partial image representing a human body or a part thereof in each of the plural images.

9. The image processing apparatus according to claim 8, wherein execution of the instructions further causes the image processing apparatus to use a partial image of at least one of the human body, a face and eyes, as the partial image representing the human body or the part thereof in each of the plural images.

10. The image processing apparatus according to claim 1, wherein execution of the instructions further causes the image processing apparatus to decide whether or not the association is correct, based on the position of the person in the space and the eye direction; and
    estimate the spatial distribution of the positions gazed by the persons, based on the positions of the persons in the space of which the association has been decided as being correct, and the eye directions.

11. The image processing apparatus according to claim 10, wherein execution of the instructions further causes the image processing apparatus to calculate a value indicating consistency of the association, and decides that the association is correct, in a case where the calculated value is larger than a threshold.

12. The image processing apparatus according to claim 10, wherein the instructions further cause the image processing apparatus to calculate a value indicating consistency of the association by integrating a value indicating consistency of the positions of the persons in the space and a value indicating consistency of the eye directions.

13. An image processing method comprising:
   detecting, respectively from plural images obtained by imaging with plural imaging units a space in which plural persons exist, positions of the persons on the images;
   performing association of a same person in the plural images;
   estimating positions of the persons in the space, based on the positions of the persons on the images detected from the plural images and a result of the association;
   estimating eye directions of the persons, based on the plural images;
   estimating a spatial distribution of positions gazed by the plural persons, based on the estimated positions of the plural persons in the space and the estimated eye directions of the plural persons; and
   estimating a gazing level for each object, based on the estimated spatial distribution of the gazed positions.

14. A non-transitory computer-readable storage medium which stores a program to cause a computer to perform:
   a detecting step of detecting, respectively from plural images obtained by imaging with plural imaging units a space in which plural persons exist, positions of the persons on the images;
   an associating step of performing association of a same person in the plural images;
   a person position estimating step of estimating positions of the persons in the space, based on the positions of the persons on the images detected from the plural images and a result of the association in the associating step;
   a direction estimating step of estimating eye directions of the persons, based on the plural images;
   a distribution estimating step of estimating a spatial distribution of positions gazed by the plural persons, based on the estimated positions of the plural persons in the space and the estimated eye directions of the plural persons; and
   a gazing level estimating step of estimating a gazing level for each object, based on the estimated spatial distribution of the gazed positions.

* * * * *